United States Patent [19]

Morgan

[11] Patent Number: 4,514,004

[45] Date of Patent: Apr. 30, 1985

[54] WIRE-ROUTING DEVICE

[76] Inventor: John M. Morgan, 230 Echo Summit, Vallejo, Calif. 94590

[21] Appl. No.: 513,556

[22] Filed: Jul. 14, 1983

[51] Int. Cl.³ .............................................. B25B 27/00
[52] U.S. Cl. .................................................. 294/19.1
[58] Field of Search ................... 294/19 R, 99, 102 R, 294/116, 19 A, 23, 29, 34, 100, 103, 115, 1 R; 81/3.8, 53.1

[56] References Cited

U.S. PATENT DOCUMENTS

| 1,439,860 | 12/1922 | Breen | 294/19 R |
| 2,096,244 | 10/1937 | Heinrich | 140/111 |
| 2,478,579 | 8/1949 | Hendley | 294/19 R |
| 2,739,832 | 3/1956 | Thorpe | 294/19 R |
| 3,866,965 | 2/1975 | Homeier | 294/19 R |
| 4,230,357 | 10/1980 | Bosch et al. | 294/19 R |
| 4,302,869 | 12/1981 | Hackney | 294/19 R |

Primary Examiner—James B. Marbert
Attorney, Agent, or Firm—Townsend & Townsend

[57] ABSTRACT

A device for snagging a length of free-hanging flexible wire at an end and retaining the wire therein as the wire is routed across an inaccessible area. The device comprises an angulated hook having a pair of opposed edges meeting in an acute angle. The edges are provided with friction means positioned to face the interior region of the angulated hook for holding a wire or the like in the apical region of the hook. In the preferred embodiment the edges are provided by the opposing sides of a pair of elongate arms, and the friction means is provided by a pair of longitudinally extending planar surfaces meeting at an apex to define a knife-edge on the inner side of each arm, the knife-edges being positioned to oppose one another so that a length of wire snagged between the arms will be retained there by friction with the knife-edges.

9 Claims, 4 Drawing Figures

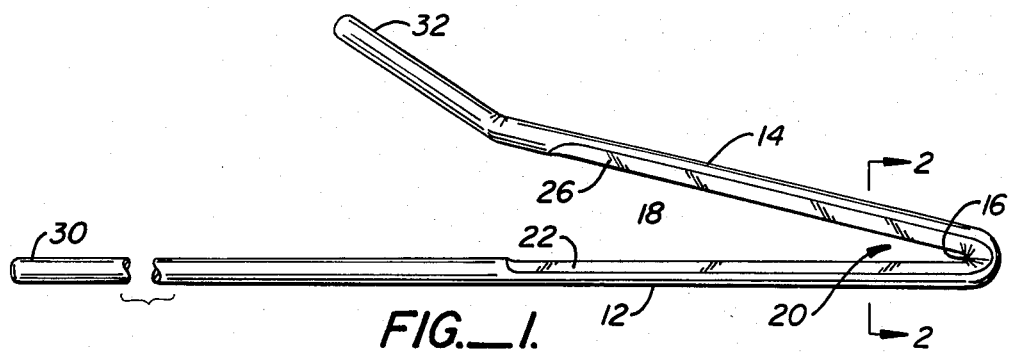
FIG._1.
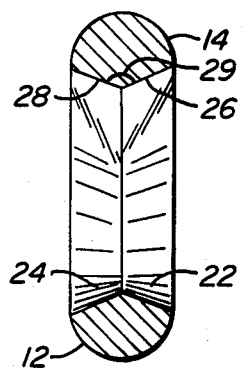
FIG._2.
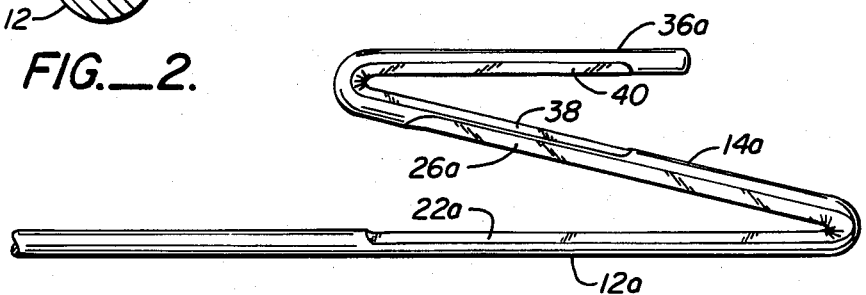
FIG._3.
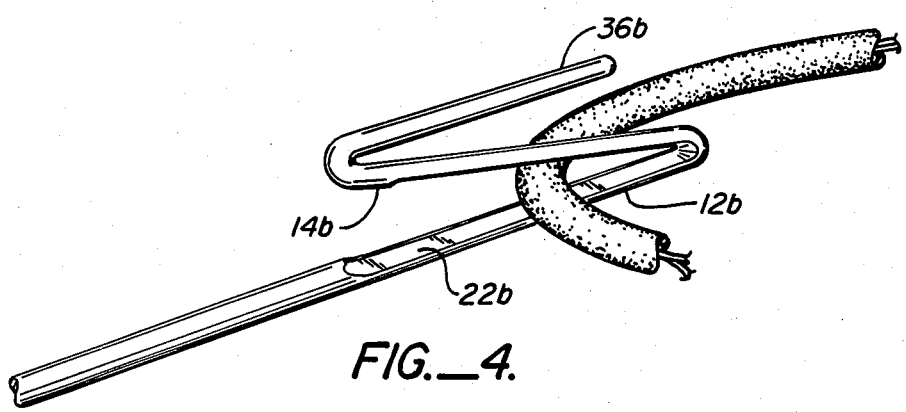
FIG._4.

WIRE-ROUTING DEVICE

BACKGROUND OF THE INVENTION

The invention relates to apparatus used by telephone installers, burglar alarm installers, and the like for manipulating lengths of wire or cable in inaccessible areas.

When installing a burglar alarm or wiring a house for telephone service, a worker is frequently called upon to route the burglar alarm wire or telephone cable across inaccessible areas. For example, wires are sometimes routed across basement or attic crawl spaces which are generally too cramped for the worker to work comfortably and which are sometimes so cramped that the worker cannot even crawl to the far reaches of the crawl space where the wires are to be run.

Various devices are known in the art for the remote manipulation of wires and cable. For example, U.S. Pat. Nos. 2,739,832 and 3,866,965 show wire-manipulating tools used by linemen for installing high-voltage wires. Tools of this sort are generally mounted at the end of a long pole, which is manipulated by the lineman for positioning the wire. The device of U.S. Pat. No. 2,739,832 provides a hook member having one or more rounded bights for retaining the wire. The device of U.S. Pat. No. 3,866,965 provides two arms or prongs projecting at acute angles from a shaft to define two notches facing in opposite directions for retaining the wire. It also includes a positioning member for guiding the wire into one or the other notch. Both of these devices are used to displace a length of cable perpendicular to the direction in which the cable runs, for example, to position a high-voltage cable on an insulator atop a utility pole.

U.S. Pat. No. 2,096,244 shows a device used to manipulate the end of a rigid tie wire for securing a high-voltage electric line to an insulator on a utility pole. The device is formed with a number of different notches which are arranged so as to provide a number of different grips as needed to twist (or untwist) the rigid tie wire about the electric line.

All of these devices are used either to manipulate rigid wires or to manipulate wires which are stretched taut between two points. In the installation of burglar alarm cable or telephone cable, often only a short length of free-hanging or freely extending flexible or semi-rigid cable is exposed. This length must be grasped at its end and drawn across the crawl space or other inaccessible area. The devices disclosed in the above-mentioned patents are useless for this purpose because they are incapable of grasping a loose, flexible wire at an end. In fact, because of the lack of any suitable device on the market, workers have resorted to fashioning makeshift tools on location out of discarded wire coat hangers for use in snagging a free cable and drawing it across the inaccessible area.

SUMMARY OF THE INVENTION

The present invention provides a hook-like device which is secured to the end of a pole and which is able to snag a short length of free-hanging flexible wire at its end and hold that wire securely as it is routed across an inaccessible area. Briefly, the invention comprises an angulated hook having a pair of opposed edges or thin and narrow edge-like surfaces meeting in an acute angle. The edges may be provided, for example, by the opposing sides of a pair of elongate arms, which are joined to one another in an acute angle. Each edge is provided with friction means positioned to face toward the interior region of the angulated hook. When a length of wire is gathered within the hook, it is urged into the apical region of the hook and held there by the friction means. If the wire exerts any resistance as it is drawn across a void area, then that resistance naturally urges the wire more tightly into the apical region, which causes the friction means to hold the wire more securely.

In a preferred embodiment the friction means is provided by a pair of opposing knife-edges, one on each of the edges forming the angulated hook. A pair of knife-edges is especially preferred as the friction means because of the tenacity with which the knife-edges grasp a large variety of sheathing materials having different frictional characteristics, which are commonly used to encase the wire or cable.

A further understanding of the nature and the advantages of the invention may be gained by reference to the following portion of the specification and the appended drawings.

BRIEF DESCRIPTION OF THE DRAWINGS

FIG. 1 is an elevational view of a wire-routing device constructed in accordance with the invention;

FIG. 2 is a cross-sectional view of the device of FIG. 1 taken along the line 2—2;

FIG. 3 is an elevational view of an alternative embodiment of the wire-routing device; and FIG. 4 is a perspective view showing another alternative embodiment snagging a wire.

DETAILED DESCRIPTION OF THE PREFERRED EMBODIMENTS

With reference to FIG. 1, a preferred embodiment of a wire-routing device constructed in accordance with the invention comprises first and second arms 12 and 14 which meet at an acute angle 16 so as to define an angulated hook. The arms 12 and 14 are provided with friction means, indicated generally at 18, disposed on the sides of arms 12 and 14 facing toward the interior region of the angulated hook. As explained more fully below, the elongate nature of the arms 12 and 14 serves to guide a length of free-hanging wire into the apical region 20 of the angulated hook, where the wire is retained by the friction means.

In the preferred embodiment of FIG. 1 each arm 12 and 14 is formed with a pair of longitudinally extending planar surfaces (the surfaces 22 and 24 on arm 12 and the surfaces 26 and 28 on arm 14) which meet at an apex along a ridge on the inwardly facing side of the respective arm to assume the shape of a wedge or a knife-edge. The term "knife-edge" is commonly understood to mean a wedge used as a fulcrum in certain instruments for a lever beam. As used herein, the term "knife-edge" refers to such a wedge-like structure. In the present invention the ridge along which the flat surfaces 22 and 24 or 26 and 28 meet, that is, the apex of the knife-edge, preferably forms an obtuse angle 29, as seen in the cross-sectional view of FIG. 2. The knife-edge formed in this manner provides the preferred friction means 18 because it tends to grasp the wire and hold it tenaciously independent of the particular material encasing the wire. The obtuse angle 29 at the apex of the knife-edge is preferred because it has less tendency to damage the casing of a wire held in the angulated hook.

The distal end of one of the arms of the wire-routing device is adapted to be secured to the end of a pole, with which a cable installer or lineman can reach and manipulate a remote length of cable. In the embodiment of FIG. 1 elongate arm 12 extends at its distal end 30 a predetermined length for attachment to the pole. The device can be attached in any of a number of ways which will occur to those of ordinary skill in the art. For example, end 30 of arm 12 can be inserted into a hole in the end of the pole and glued in position. Alternatively, the distal end 30 can be clamped or lashed to the end of the pole. The device can also be fabricated with clamping means secured to end 30 of arm 12, making for convenient demountable attachment to the end of the pole.

To assist in quickly snagging a free length of cable, the device preferably includes a means for guiding the cable into the angulated hook. In the embodiment of FIG. 1 the guide means is provided by elongate member 32, which joins arm 14 at an angle so as to extend away from arm 12 and thereby widen the opening or mouth of the angulated hook.

In operation, the pole is stretched across a void region and manipulated to guide the loose end of a wire or cable into the apical region of the angulated hook. When the knife-edges or other friction means make contact with the outer casing of the wire, they grasp the wire with sufficient friction to prevent it from slipping through the hook. It is an important aspect of the invention that some form of friction means be provided on the inwardly facing edges of arms 12 and 14 for preventing the wire from slipping. A simple angulated hook by itself will not function to grasp a length of wire and hold it against any kind of resistance as the wire is pulled across a void area. The knife-edges are found to provide surprisingly effective friction means, independent of the casing material. The knife-edges pinch the casing of the wire to retain it securely within the apex of the angulated hook. The more resistance to pulling exerted by the wire, the tighter the knife-edges pinch the casing. If the wire should become entangled or ensnared so that it cannot be pulled free to be drawn across the void area, then if one were to continue pulling on the wire against the obvious indications that the wire is hung up, the knife-edges would eventually begin to cut into the wire casing rather than allow the wire to slip through the angulated hook. However, in the normal usage of the wire-routing device, when the apexes of the knife-edges are formed in an obtuse angle as described above, no lasting damage to the casing will result. As a rule, damage to the casing results only in extreme circumstances, for example, when the user persists in attempting to pull the wire after the wire has become immovably hung up. Since the device is generally used to snag a wire at an end, even in the extreme case when damage to the wire casing occurs, the user can trim the damaged end of the wire without significant loss.

The surprising effectiveness of the present invention is illustrated by the following test results. A twisted pair of 22 gauge stranded wires with PVC insulation but no outer sheathing was snagged with the preferred embodiment of the wire-routing device disclosed herein and subjected to an increasing pulling force. No slippage of the twisted pair through the angulated hook was observed as the pulling force on the pair was increased to the failure point of the wire, which occurred at the point of contact with the angulated hook when the pulling force reached roughly 25 pounds. In normal usage the pulling force would amount to only several pounds. In another test a four-conductor line of 22 gauge stranded wire encased in a vinyl jacket was subjected to an increasing pulling force. The test was discontinued at a pulling force of 50 pounds when no slippage was observed and the device had begun to cut into the vinyl jacket. It is emphasized that pulling forces of 25 or 50 pounds greatly exceed the typical magnitudes expected to be applied in the normal application of the device.

As described thus far, the invention is useful only for snagging the end of a distant wire and pulling it toward the user. The user will, of course, occasionally want to draw the wire in the opposite direction toward a more distant location. For this purpose the wire-routing device may be provided with a second angulated hook facing in the opposite direction. Examples of two-hook embodiments are shown in FIGS. 3 and 4, where like elements are designated by like numerals with distinguishing letters. In the embodiment of FIG. 3 the second angulated hook is defined by a third elongate arm 36a meeting second arm 14a in an acute angle so as to open in the opposite direction to the first angulated hook defined by arms 12a and 14a. As illustrated in FIG. 3, arm 14a has a second pair of longitudinally extending planar surfaces meeting at an angle to define a knife-edge in addition to the pair of planar surfaces on the opposite side of arm 14a. Surfaces 38 and 26a are visible in the elevational view of FIG. 3. Arm 36a similarly has a pair of longitudinally extending planar surfaces (only one of which, the surface 40, is visible in FIG. 3) defining an opposing knife-edge. Equipped in this manner with first and second angulated hooks facing in opposite directions, the device can be manipulated to draw a distant loose end of wire toward or away from the user.

In practice, a worker is usually called upon either to draw a length of wire from a distant location toward the worker or from the worker toward a distant location. For such application only the first angulated hook in FIG. 3 defined by arms 12a and 14a need be provided with friction means; the second angulated hook defined by arms 14a and 36a can be fabricated without any friction means. In operation, the first angulated hook is used to draw a distant length of wire toward the worker as described above. When it is desired to draw the wire from the location of the worker to a distant location, the worker need merely tie a loop in the end of the wire and place it on the second angulated hook, so that no friction means are required on the arms of the second hook under these circumstances. FIG. 4 illustrates an embodiment having friction means only on the first angulated hook, which is shown snagging a length of wire. The embodiment, in which only one of the angulated hooks is provided with friction means, is advantageous in that it is more economical to manufacture, yet provides a tool which will meet the needs of the cable installer in most situations.

While the above provides a full and complete disclosure of the invention, other variations, modifications, and equivalents will occur to those skilled in the art. For example, other forms of friction means could be employed, such as a series of friction ridges, or serrations angled toward the apex of the angulated hook, or a frictional coating. Moreover, although it ha been found cost-effective and convenient to manufacture the device with one or two angulated hooks from a spring steel rod, other constructions could also be used. To define an angulated hook, a member need only have two opposing edges meeting in an acute angle. The edges must be sufficiently wide to support friction means such as the knife-edges described above. Thus, the angulated hook construction of the present invention could also be provided by a flat strip of thin steel having an appropriately shaped notch in one side with knife-edges formed on the opposing edges of the notch.

All such variations, modifications, and equivalents are considered to fall within the spirit and scope of the present invention, which is defined by the appended claims.

What is claimed:

1. A device adapted to be mounted on a pole and used for routing a length of wire or the like across an inaccessible area, said device comprising:
a member having a pair of opposed edges meeting in an acute angle to define an angulated hook for snagging said wire, said edges being provided with friction means for retaining a snagged wire within said angulated hook; and
means for mounting said member on said pole.

2. The device of claim 1, wherein said friction means comprises a pair of elongate planar surfaces extending along each said edge and meeting at an apex to define a knife-edge.

3. A device for use with a pole for drawing a length of wire or the like across an inaccessible area, said device comprising:
first and second elongate arms meeting in an acute angle to define an angulated hook for snagging said wire;
said first and second arms being provided with friction means on opposing sides thereof for retaining a snagged wire within said angulated hook; and
means for mounting said device on said pole.

4. A device adapted to be mounted on an end of a pole and used for routing a length of wire or the like across an inaccessible area, said device comprising:
first and second elongate arms meeting in an acute angle to form a first angulated hook for snagging said wire; wherein said first arm has a portion formed for mounting on said pole and said first and second arms are each formed with a pair of longitudinally extending planar surfaces meeting at an apex to define a knife-edge; said planar surfaces being positioned on said first and second arms so that said knife-edges face one another, whereby a length of wire snagged between said arms will be retained therebetween by friction with said knife-edges 5. The device of claim 4, further comprising a third elongate arm meeting said second arm at an acute angle to form a second angulated hook opening in the opposite direction from said first hook.

6. The device of claim 5, wherein said second and third arms are each formed with a pair of longitudinally extending planar surfaces meeting at an apex to define a knife-edge, said planar surfaces being positioned on said second and third arms so that the knife-edges formed thereby face one another.

7. The device of claim 4, further including guide means at said second arm for guiding said wire into said first angulated hook.

8. The device of claim 7, wherein said guide means is provided by an elongate member meeting said second arm at an angle and extending away from said first arm so as to widen the opening to said first angulated hook.

9. The device of claim 4, wherein said pairs of longitudinally extending planar surfaces meet in an obtuse angle at said apex.

* * * * *